United States Patent [19] [11] 3,814,120
Moen [45] June 4, 1974

[54] PLUG VALVE

[76] Inventor: Alfred M. Moen, 25 Lakeview Dr., Grafton, Ohio 44044

[22] Filed: Mar. 26, 1973

[21] Appl. No.: 344,506

[52] U.S. Cl............ 137/242, 137/271, 137/329.02, 137/454.6, 137/606, 251/175, 251/288
[51] Int. Cl............................................... F16k 3/02
[58] Field of Search ...... 137/242, 270, 271, 329.02, 137/329.04; 251/175, 288

[56] References Cited
UNITED STATES PATENTS
3,241,809  3/1966  Smith............................. 251/175 X
3,296,026  1/1967  Long.............................. 251/175 X
3,489,389  1/1970  Kaatz............................. 251/175 X Primary Examiner—Harold W. Weakley
Attorney, Agent, or Firm—Kinzer, Plyer, Dorn & McEachran

[57] ABSTRACT

An on-off fluid valve utilizes a rotatable stem positioned within a fixed sleeve. The stem has a passage extending through it which can be placed into register with the sleeve inlet and outlet. The stem includes a blade portion and a flexible seal member surrounding the blade portion. The seal member is sufficiently loosely held on the blade portion of the stem such that fluid pressure at the sleeve inlet provides sealing pressure by the seal member against the sleeve outlet.

22 Claims, 15 Drawing Figures

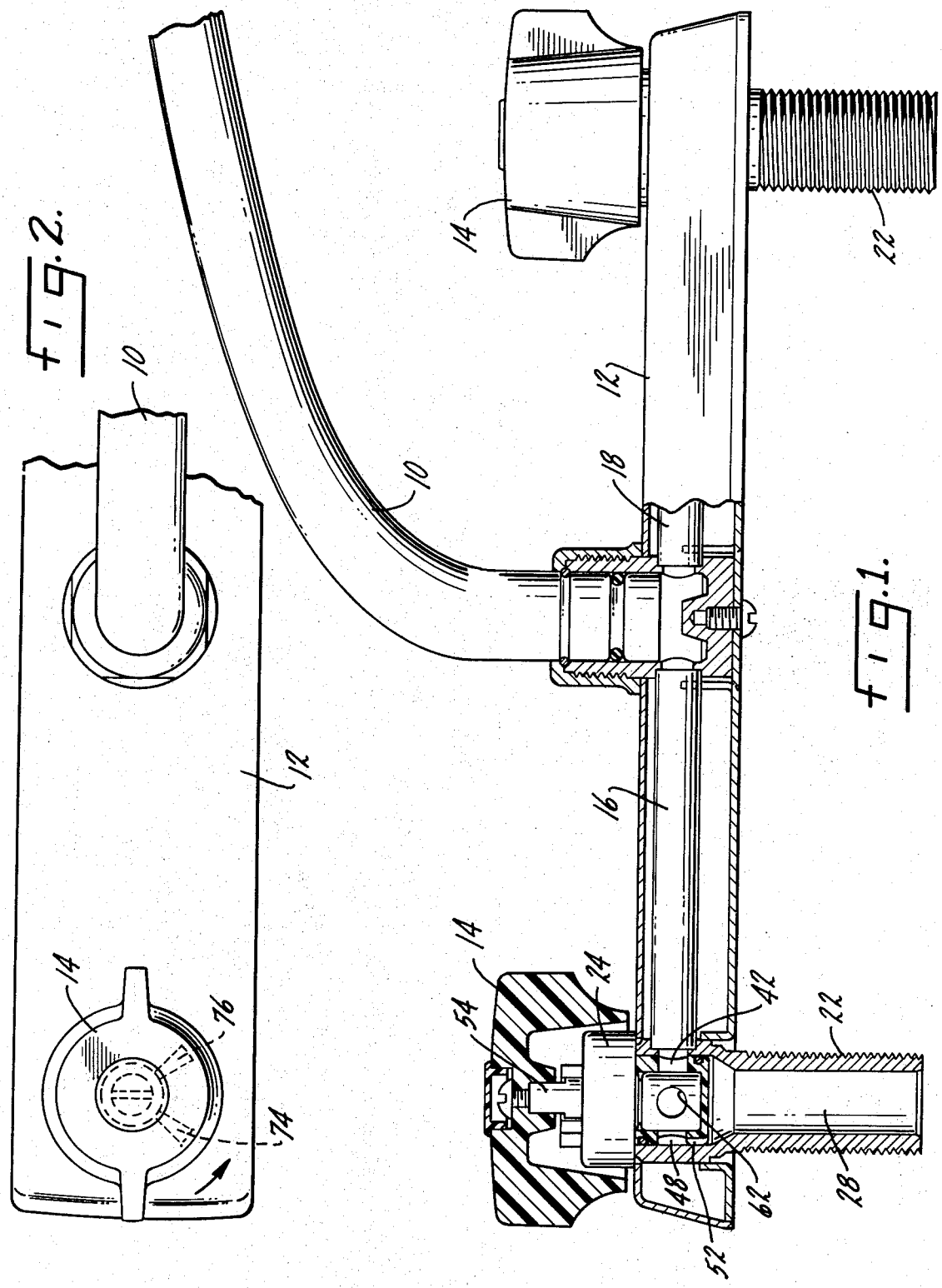

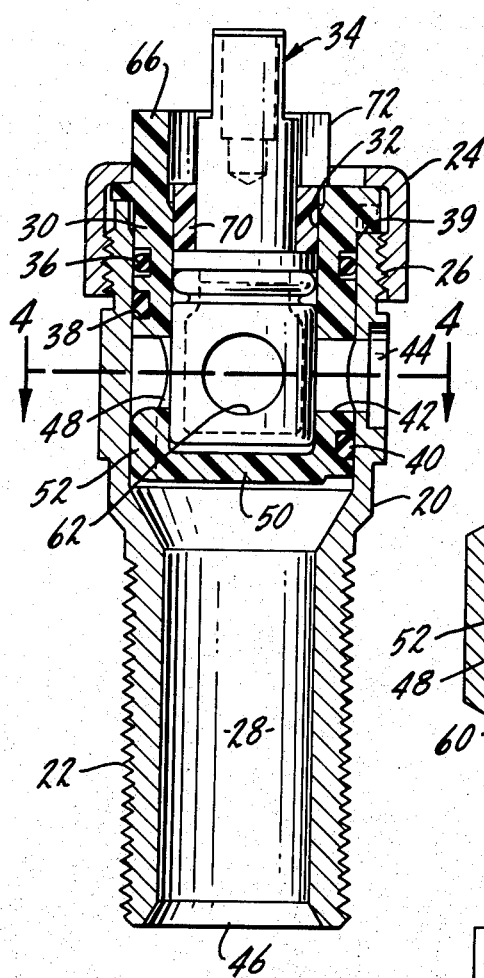
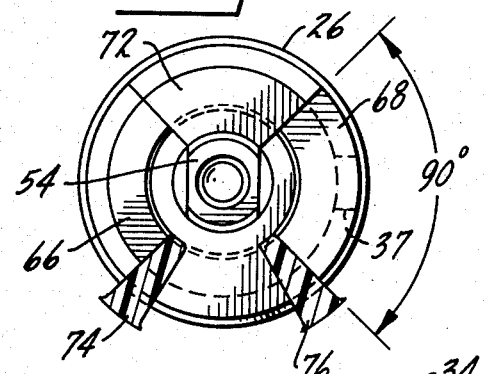
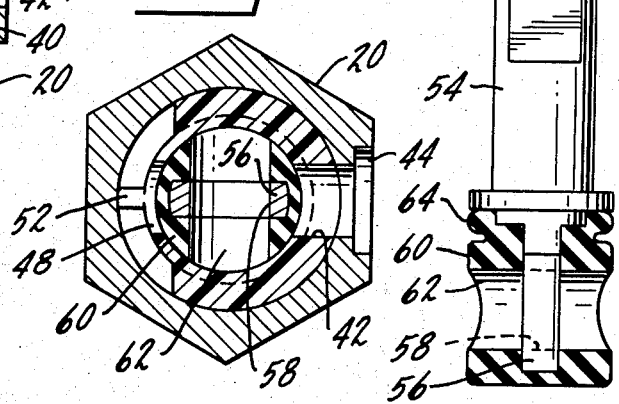
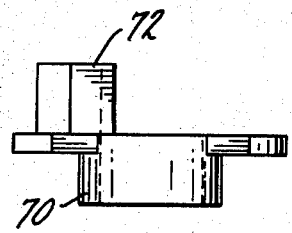
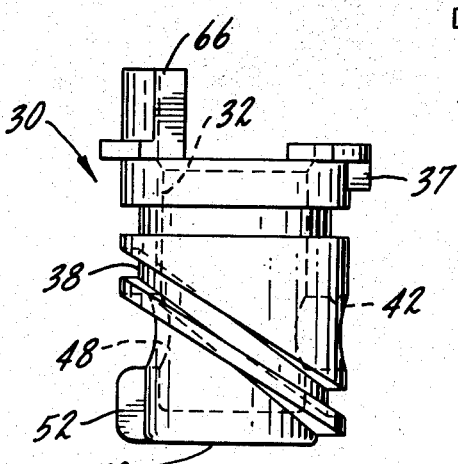
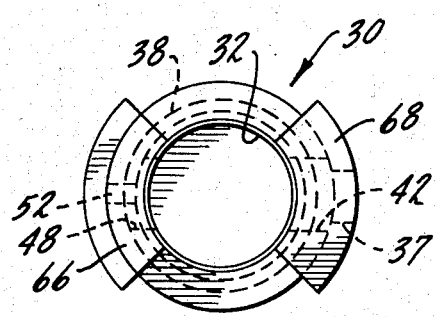

3,814,120

PLUG VALVE

SUMMARY OF THE INVENTION

The present invention relates to a valve member of the type which can be used in a two-handle hot and cold water faucet.

A primary purpose of the invention is a valve construction of the type described in which a flexible seal member is fixed on a rotatable stem and sealing pressure is applied at the valve outlet.

Another purpose is a valve construction of the type described in which the flexible seal member is reversible to compensate for wear on one side or it.

Another purpose is a valve construction of the type described in which the entire valve structure is reversible to accomodate both clockwise and counterclockwise opening of the valve.

Another purpose is a valve construction in which movement of the valve stem is smooth and uniform.

Another purpose is a valve construction including cooperating means on the handle and valve sleeve to limit rotation of the handle to approximately one-quarter turn.

Another purpose is a valve construction of the type described in which the sleeve, seal member and stem have bottom aligned inlets.

Another purpose is a valve construction of the type described in which the interior surface of the sleeve is relieved to preclude binding between the sleeve and valve stem.

Another purpose is a valve construction of the type described including means for cleaning the seal member as it rotates.

Other purposes will appear in the ensuing specification, drawings and claims.

BRIEF DESCRIPTION OF THE DRAWINGS

The invention is illustrated diagrammatically in the following drawings wherein:

FIG. 1 is a side view, with portions removed, showing a faucet construction utilizing valves of the type disclosed herein, FIG. 2 is a partial top view of the faucet of FIG. 1, FIG. 3 is an enlarged axial section illustrating the valve construction disclosed herein, FIG. 4 is a section along plane 4—4 of FIG. 3, FIG. 5 is a top plan view of the valve assembly with portions of the handle removed, FIG. 6 is an axial section, through the valve stem, FIG. 7 is a side view of the valve sleeve, FIG. 8 is a top view of the valve sleeve, FIG. 9 is a side view of a bearing member.

DESCRIPTION OF THE PREFERRED EMBODIMENT

Figure 10:
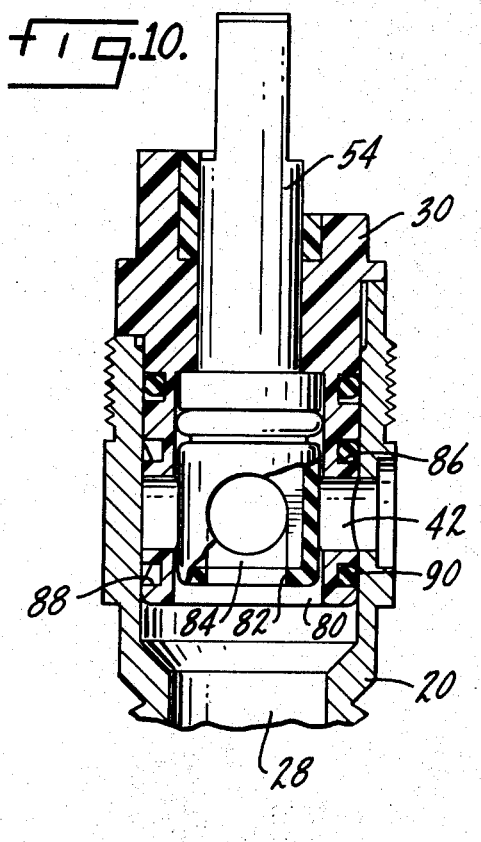
FIG. 10 is a partial axial section illustrating a modified form of the invention.

The present invention relates to a valve construction which finds application in the field of two-handled faucets. The particular advantages of the valve construction shown permit its use in substantially wider applications and it is the valve structure itself, not the use, which is important.

In FIG. 1, a typical two-handle kitchen faucet is shown to have a spout 10 and a base or escutcheon 12. Handles 14 are positioned on opposite sides of the spout and will conventionally control the flow of hot and cold water to the spout. Within the escutcheon 12 are conduits 16 and 18 which convey water from the left and right-hand or hot and cold water valve structures to the spout 10. The details of the escutcheon, spout and the conduits may be conventional.

Consideraing the specific valve structure shown at the left-hand side of FIG. 1 and in detail in FIG. 3, a body member or housing 20 having a lower threaded portion 22 for use in a conventional plumbing connection is mounted into the escutcheon 12 by means of a threaded nut 24. The nut 24 threads onto a top threaded area 26 on the body 20. A water passage 28 is formed by the body or housing 20 and directs water upwardly toward a sleeve member 30. The sleeve is shown in detail in FIGS. 7 and 8 and includes a central chamber 32 mounting the valve member indicated generally at 34. The sleeve 30 is generally cylindrical in configuration and has an upper O-ring 36 positioned within an exterior groove to prevent water leaking upwardly toward the handle. A diagonal groove 38 is positioned on the exterior of the sleeve 30 and has a diagonal O-ring 40 which prevents the flow of water from the sleeve inlet to the sleeve outlet. The sleeve 30 may have a locating projection 37 positioned within the slot 39 in the housing 20.

The sleeve outlet is indicated at 42 and is in alignment with the body outlet 44 which connects to the conduit 16. The body 20 has its inlet 46 formed at the lower end thereof and the sleeve inlet 48 is formed on the opposite side from the sleeve outlet 42. That portion of the lower section of the sleeve, adjacent its closed bottom 50, is inwardly relieved, except for a spacing portion 52 at the left side as shown in FIG. 3 and that portion adjacent the lower part of the diagonal O-ring. This, water flowing inwardly through the open bottom 46 of the body 20 flows around the lower part of the sleeve and to the sleeve inlet 48.

The valve member 34 includes a stem 54, the upper end of which is formed to receive a screw of the like to attach the handle 14. The lower portion of the stem 54 has a blade-like section or rectangular section 56 which has a passage 58 formed generally in the center thereof. A flexible seal member 60 encloses the lower portion of the stem 54 or the blade-like section 56 and has a passage 62 in register with the stem passage 58. The seal 60 has an integral O-ring 64 adjacent its upper end which prevents the seepage of water upwardly along the stem 54. The interior of the seal member 60 has a configuration generally the same as or matching or mating that of the blade-like section 56 of the stem 54 so that rotation of the stem will provide positive rotation of the rubber seal member 60. That portion of the blade below ring 64 is larger in cross section than the upper part to firmly hold the seal member to the blade.

The blade-like portion of the stem and the mating interior of the seal member 60 provide uniform and smooth stem movement when the valve member is rotated under pressure. There is contact all about the blade member and hence there is support by the blade member for all portions of the seal member 60 as the stem is rotated.

The upper end of the sleeve 30 has a projection 66 which extends above the nut 24 and is generally in the area of about 90 degrees in circumferential extent. The diammetrically opposite portion of the upper end of the sleeve 30 provides a flat surface 68, also approximately 90° in circumferential extent. In between the projection 66 and the flat section 68 there are two quadrants, approximately 90° in circumferential extent, which may receive a bearing member 70 illustrated in FIG. 9. The bearing 70, as illustrated in FIG. 3, is seated on top of the sleeve 30 and has a projection 72 which may be positioned in either of the two open quadrants of the sleeve top as indicated in FIG. 8.

The handle 14 has a pair of projections 74 and 76, spaced generally 90° apart, which interact with the projection 66 on the sleeve and the projection 72 on the bearing to limit rotation of the handle member to 90° or approximately a quarter turn.

In operation, and assuming the valve is assembled in the manner shown, the handle 14 may be rotated approximately 90 degrees from a position in which projection 74 on the handle strikes projection 66 on the sleeve, thus limiting clockwise movement, to a position in which projection 76 on the handle strikes projection 72 on the bearing 70, thus limiting counterclockwise movement. The valve is turned from a completely on to a completely off position by the above described quarter-turn movement. Varying degrees of handle rotation within the quarter-turn limitations may be used to control the volume of fluid passing through the valve.

Of particular advantage of the invention is the fact that the direction of valve opening rotation and the disposition of the valve may be reversed so that the valve can be used to provide on movement with either counterclockwise or clockwise turning. For example, when the valve of FIG. 3 is to be used on the righthand side of the faucet of FIG. 1, the sleeve and body will be turned 180° to position the outlets toward the center. The bearing 70 will likewise be reversed so that the interaction between the bearing projection and the sleeve projection will again permit approximately a quarter-turn of handle rotation, but with the on direction being the opposite of that when the valve is assembled in accordance with FIG. 3. Thus, the valve arrangement shown may be usable in either a hot or cold water situation with no change in the parts, only a reversal in the positioning of the parts.

Of importance is the fact that the seal member 60 is not tightly held on the blade-like portion 56 of the stem 54. Rather, there is a degree of flexibility and sufficient looseness such that when the valve is in the closed position of FIG. 3, water passing to the sleeve inlet 48 will cause the seal 60 to seal against the sleeve outlet 42. Thus, the valve seal is at the outlet side and not the inlet side.

Since the seal member 60 is symmetrical, at such time as one portion or one side becomes worn, due to constant use, the valve member 34 and the seal member 60 may be rotated 180° to place the unused side of the seal member in position to be the sealing side. Thus, the life of the valve is substantially increased by permitting both sides of the seal member to be utilized without disassembly and without removal of water pressure.

The combination of the flat blade and the mating portion of the seal member provide firm support for the seal member as it is rotated under pressure from its on to off position. The valve member is thus easily turned within the sleeve and rotation is smooth and uniform.

Figure 11:
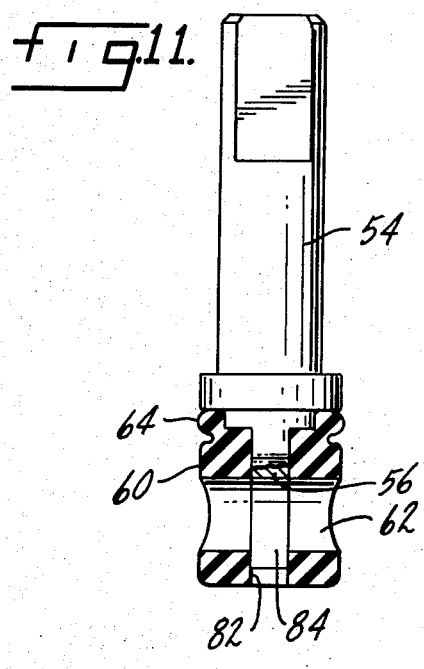
FIG. 11 is a side view, in part section, of the valve member of FIG. 10.
Figure 13:
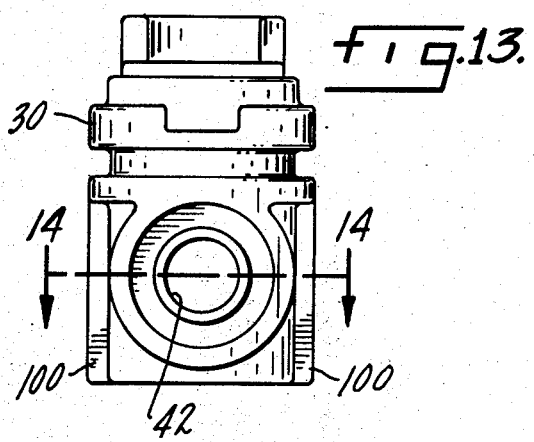
FIG. 13 is a side view of the sleeve of FIG. 12.
Figure 12:
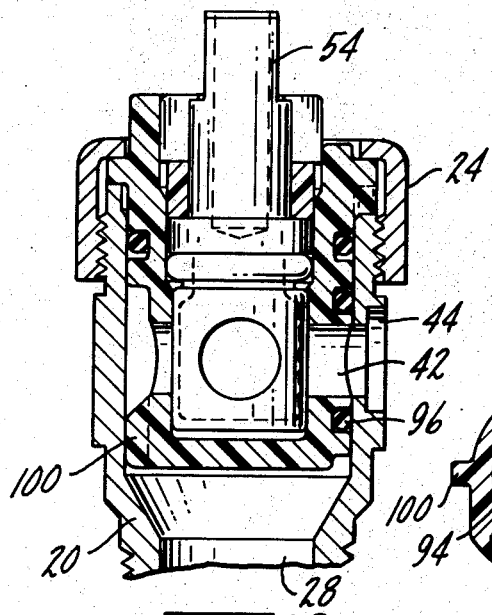
FIG. 12 is a partial axial section, similar to FIG. 3, showing yet a further modified form of the invention.
Figures 14, 15:
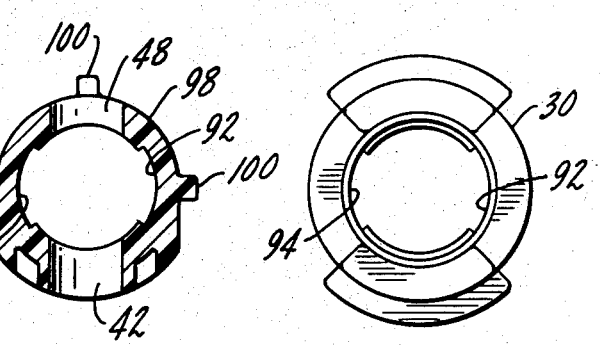
FIG. 14 is a section along plane 14—14 of FIG. 13.
FIG. 15 is a top plan view of the sleeve of FIG. 13.

FIGS. 10 and 11 show a modified form of the invention in which like parts have been given like numbers. The sleeve 30 has a bottom inlet 80 which is in alignment with a bottom opening 82 in the seal member 60. In like manner, the blade portion 56 of the stem 54 has a bottom opening notch 84 so that water entering through the aligned inlets 80 and 82 in the sleeve and seal member can flow through the stem and then outwardly through the outlets described above.

The diagonal groove 38 in the sleeve has been replaced by a pair of annular grooves 86 and 88 on opposite sides of the sleeve 30. In groove 86 there is a seal ring 90 which is effective to form a seal with the interior of the housing to prevent seepage of water between the housing and sleeve. As shown in FIG. 10, there is no similar seal ring in groove 88 as there is no necessity of having a seal at this particular location. The groove is formed, however, so that the sleeve is symmetrical and may be used with either side as the outlet.

Turning to that form of the invention shown in FIGS. 12-15, again like parts have been given like numbers. The interior surface of the sleeve 30 has generally arcuate outwardly-relieved areas 92 and 94 which are generally diammetrically opposed. The depth of the relief is not particularly important, however, the sleeve should not be weakened at the relieved areas. Note that the relieved areas 92 and 94 are generally 90° from the inlet and outlet of the sleeve. An o-ring 96 surrounds the outlet port, much in the manner of the structure in FIGS. 10 and 11. The outer surface of the sleeve is relieved, as at 98, similar to FIG. 3, except that the relieved area has greater circumferential extent. Also, there are three spacers 100 to position the sleeve within the housing.

The relieved areas 92 and 94 are particularly advantageous in that the rubber or rubberlike material of the seal member is not tightly contained. Thus, the valve stem may smoothly turn within the sleeve without restriction. Also, the sharp edges or corners formed where the relieved areas meet the internal surface of the sleeve have a tendency to rub against the outer surface of the seal member, thus cleaning it as it rotates.

Although the invention has been described as including a housing member, a sleeve and a valve member, in some applications either the housing or the sleeve may be eliminated and the valve member may work directly within a single enclosing member. In such an application the valve member would be functioning as a shut-off element.

Whereas the preferred form of the invention has been shown and described herein, it should be realized that there may be many modifications, substitutions and alterations thereto.

The embodiments of the invention in which an exclusive property or privilege is claimed are defined as follows:

1. A valve structure including a housing having an inlet and an outlet, a sleeve positioned within said housing and having an inlet and outlet communicating with said housing inlet and outlet,
a valve member rotatably positioned within said sleeve, and valve member including a stem and a sealing member enclosing that portion of the stem positioned opposite the sleeve inlet and outlet, a passage through said stem and seal member, rotation of said stem and seal member moving said passage into and out of register with said sleeve outlet,
said seal member being flexible and sufficiently loosely held by said stem such that fluid pressure at the sleeve inlet causes the seal member to seal against the sleeve outlet.

2. The structure of claim 1 further characterized in that said seal member is generally cylindrical in shape at its exterior and has an integral ring positioned to form a seal with the interior of the sleeve away from said sleeve inlet and outlet.

3. The structure of claim 1 further characterized in that a portion of the stem positioned within the seal member has a generally rectangular cross section, with that portion of the interior of the seal member surrounding the stem rectangular portion having generally the same cross sectional shape and size.

4. The structure of claim 1 further characterized in that a major portion of the stem positioned within the seal member has a blade-like configuration, with the interior of the seal member having a mating configuration.

5. The structure of claim 4 further characterized in that said seal member has a generally cylindrical exterior.

6. The structure of claim 1 further characterized in that said sleeve has a closed bottom and said seal member has a closed bottom.

7. The structure of claim 1 further characterized by and including a handle attached to the stem and cooperating means on the handle and sleeve for limiting rotation of the handle.

8. The structure of claim 7 further characterized by and including an outwardly extending projection at one end of the sleeve and inwardly extending projections on a portion of the handle, said projections cooperating to limit rotation of the handle and stem.

9. The structure of claim 8 further characterized in that the projection on the sleeve is approximately 90° in circumferential extent.

10. The structure of claim 8 further characterized by and including a bearing positioned within a portion of the sleeve and having a projecting area generally equal in circumferential extent to that of the projection on the sleeve.

11. The structure of claim 10 further characterized in that the bearing projection and the sleeve projection are each approximately 90° in circumferential extent.

12. The structure of claim 10 further characterized in that said bearing may be positioned on opposite sides of the sleeve projection for use in providing on-off handle rotation in two different directions.

13. The structure of claim 8 further characterized by and including a flattened area on said sleeve and generally diammetrically opposed to said projection.

14. The structure of claim 13 further characterized in that said flattened area has the same circumferential extent as said sleeve projection.

15. The structure of claim 1 further characterized by and including a circumferentially extending diagonal groove on the exterior of the sleeve and a seal member positioned within said groove for sealing the exterior of the sleeve and the interior of the housing.

16. The structure of claim 1 further characterized in that said sleeve has a bottom inlet and said seal member passage having a bottom inlet in register with the sleeve inlet.

17. The structure of claim 16 further characterized by and including a bottom opening slot in the stem forming the stem passage.

18. The structure of claim 1 further characterized in that portions of the interior of the sleeve, adjacent the seal member, are outwardly relieved.

19. The structure of claim 18 further characterized in that said relieved areas are generally diammetrically opposed.

20. The structure of claim 19 further characterized in that said relieved areas are positioned generally 90° from the sleeve inlet and outlet.

21. The structure of claim 18 further characterized in that said sleeve relieved areas provide edges adjacent and in contact with said seal member.

22. A valve structure including an enclosure having and inlet and an outlet, a valve member rotatably positioned within said enclosure, said valve member including a stem and a seal member enclosing that portion of the stem positioned opposite the enclosure inlet and outlet, a passage through said stem and seal member, rotation of said stem and seal member moving said passage into and out of register with said enclosure outlet, and seal member being flexible and sufficiently loosely held by said stem such that fluid pressure at the enclosure inlet causes the seal member to seal against the enclosure outlet.

* * * * *